United States Patent [19]

Asano et al.

[11] Patent Number: 4,853,782
[45] Date of Patent: Aug. 1, 1989

[54] CLAMPING CIRCUIT FOR CLAMPING VIDEO SIGNAL

[75] Inventors: Yoshikazu Asano; Kazuo Naganawa, both of Kakamigahara, Japan

[73] Assignee: Sanyo Electric Co., Osaka, Japan

[21] Appl. No.: 165,691

[22] Filed: Mar. 9, 1988

[30] Foreign Application Priority Data

Mar. 12, 1987 [JP] Japan .................. 62-57486

[51] Int. Cl.[4] ............................................... H04N 5/04
[52] U.S. Cl. .................................... 358/148; 358/153; 358/172
[58] Field of Search .................. 358/171, 172, 34, 160, 358/153, 148, 13; 328/175; 307/540, 546, 562; 375/76, 116

[56] References Cited

U.S. PATENT DOCUMENTS 3,476,875  11/1969  Davis .................................. 358/171
4,707,730  11/1987  Alard .................................. 358/153

FOREIGN PATENT DOCUMENTS 0149869  11/1981  Japan .................................. 358/153
58-124373  7/1983  Japan .
61-210770  9/1986  Japan .

OTHER PUBLICATIONS

Nikkei Electronics, Mar. 12, 1984, pp. 112-116.

Primary Examiner—James J. Groody
Assistant Examiner—David E. Harvey
Attorney, Agent, or Firm—Armstrong, Nikaido, Marmelstein, Kubovcik & Murray

[57] ABSTRACT

A frame synchronizing signal detecting circuit detects a frame synchronizing signal in a video signal. When the frame synchronizing signal is not detected by the frame synchronizing signal detecting circuit, a clamp level switching circuit is responsive to a switching signal from a timer circuit for generating alternately an upper clamp potential $V_+$ and a lower clamp potential $V_-$. When the frame synchronizing signal is detected by the frame synchronizing signal detecting circuit, the clamp level switching circuit generates a normal clamp potential $V_0$. A clamping pulse generating circuit is responsive to an output from the frame synchronizing signal detecting circuit for generating a clamping pulse. A clamping circuit is responsive to the clamping pulse for clamping an analogue video signal at the clamp potentials $V_0$, $V_+$ or $V_-$ from the clamp level switching circuit.

7 Claims, 5 Drawing Sheets

CLAMPING CIRCUIT FOR CLAMPING VIDEO SIGNAL

BACKGROUND OF THE INVENTION

1. Field of the Invention

The present invention relates to a clamping circuit for video signal and more particularly, to a clamping circuit for dc-clamping once an analogue video signal of a positive polarity synchronization type in which frame synchronizing signal exists in the range of the level of a video signal, such as a high-resolution television signal whose bandwidth is compressed by a multiple sub-nyquist sampling system before analogue-to-digital conversion in order to detect the frame synchronizing signal from the digital signal to which the analogue video signal is converted.

2. Description of the Prior Art

A high-resolution television signal proposed by Japan Broadcasting Corporation (NHK) is an analogue video signal of a positive polarity synchronization type as described above, which is discussed in, for example, "Nikkei Electronics", Mar. 12, 1984, pp. 112–116. More specifically, the high-resolution television signal has a horizontal synchronizing signal H having an inclined portion and a frame synchronizing signal F comprising 17.5 times repetitive pulses. The horizontal synchronizing signal H is inserted into each line, and the frame synchronizing signal F is inserted into the 605th line and the 606th line with polarities opposite to each other.

FIG. 2 shows main portions of a high-resolution television receiver for receiving such a high-resolution television signal and reproducing a high-resolution video signal. The high-resolution video signal (referred to as video signal hereinafter) is inputted to an input terminal 1. A clamping circuit 2 is responsive to a clamping pulse as described below for dc-clamping the video signal inputted to the input terminal 1. A low-pass filter 3 cuts an unnecessary high frequency component of the video signal outputted from the clamping circuit 2. An A/D converter 4 converts the output signal from the low-pass filter 3 into a digital signal in 8-bit parallel representing 256 tone wedges. A digital processing portion 5 performs interframe interpolation, interfield interpolation, TCI decoding and the like of the digital signal outputted from the A/D converter 4 and restores the digital signal to a base band video signal. A D/A converter portion 6 restores the output signal of the digital processing portion 5 to an analogue video signal and applies the same to a television picture tube 7.

On the other hand, the most significant digit of the output signal of the A/D converter 4 is applied to a frame synchronizing signal detecting circuit 8. The frame synchronizing signal detecting circuit 8 detects the frame synchronizing signal F based on the most significant digit of the output signal thereof and generates a horizontal synchronizing pulse HP and a vertical synchronizing pulse VP by utilizing as a reference the frame synchronizing signal F. A clamping pulse generating circuit 9 generates a predetermined clamping pulse CP at predetermined timing as described below within a vertical blanking time period in the analogue video signal inputted to the input terminal 1 based on the horizontal synchronizing pulse HP and the vertical synchronizing pulse VP from the frame synchronizing signal detecting circuit 8.

Detailed description is now made on an operation for detecting the frame synchronizing signal F by the frame synchronizing signal detecting circuit 8. A low level and a high level of the frame synchronizing signal F (in FIG. 1) are selected at levels of 25% (64/255) and 75% (192/255) of the amplitude of the video signal, respectively. Consequently, if the frame synchronizing signal F is converted from an analogue signal to a digital signal, the low level and the high level thereof become 01000000 and 11000000, respectively. Thus, when the frame synchronizing signal F is correctly outputted from the A/D converter 4, the most significant bit of the output signal of the A/D converter 4 comprises the defined number of regular repetitions of "0" and "1", which is utilized for detecting the frame synchronizing signal F.

On the other hand, the clamping circuit 2 performs the following operation as preliminary processing for detecting such a frame synchronizing signal. More specifically, a signal at a level corresponding to 50% of the amplitude of the video signal is inserted into the 5-th line or the 567-th line within a vertical blanking time period in the video signal as a reference level for clamping. The clamping circuit 2 is responsive to the above described clamping pulse CP for clamping the reference level of the video signal at a clamp potential $V_0$. The clamp potential $V_0$ is set in the middle value of a range R of input voltage of A/D converter 4.

Thus, if and when the above described reference level (50%) is correctly clamped at the clamp potential $V_0$ as shown in FIG. 3(a), the frame synchronizing signal F is correctly located in 25 to 75% of the above described range R of input voltage, so that the high level and the low level thereof are converted into the above described digital values 01000000 and 11000000 in the A/D converter 4. As a result, the frame synchronizing signal F is detected in the above described manner. When not the reference level itself but a level (level in the range of the amplitude of the frame synchronizing signal F, that is, 25 to 75% of the range R of input voltage) in the vicinity of the reference level is clamped at the clamp potential $V_0$ in the unstable state, for example, immediately after reception is started, the frame synchronizing signal F is not converted into the above described normal digital value. However, since the most significant digit of the frame synchronizing signal F comprises repetition of "1" and "0" as at the time of the normal operation, the frame synchronizing signal F can be also detected in this case.

However, in the above described unstable state, for example, immediately after reception is started, it is assumed that a video signal, by which level the entire picture becomes black or white, for example, continues for several fields before the frame synchronizing signal F is detected. In such a state, since the clamping pulse CP from the clamping pulse generating circuit 9 is not in a normal timing position, a black level or a white level of the video signal is clamped at the above described predetermined clamp potential $V_0$ by the clamping pulse CP. FIGS. 3(b) shows the case in which the black level (0%) is clamped at the clamp potential $V_0$. In this case, since the frame synchronizing signal F is located in 75 to 100% of the range R of input voltage, the most significant digit of the digitalized frame synchronizing signal F is always "1". Portions represented by the broken line in FIGS. 3(b) are cut by a limiter operation in the A/D converter. Thus, the frame synchronizing signal F cannot be detected.

SUMMARY OF THE INVENTION

An object of the present invention is to provide a clamping circuit for clamping a video signal, which is able to surely detect a frame synchronizing signal even in a transient state, for example, in a state appearing immediately after reception is started and thereby to normally perform the subsequent clamping operation.

In order to attain the above described object, a clamping circuit for clamping a video signal according to the present invention clamps at a predetermined potential an analogue video signal of a positive polarity synchronization type in which a frame synchronizing signal exists within the range of the level of a video signal, the clamping circuit comprising frame synchronizing signal detecting means for detecting the frame synchronizing signal from the analogue video signal, clamping pulse generating means responsive to an output of the frame synchronizing signal detecting means for generating a clamping pulse, clamp potential switching means for outputting periodically a plurality of different clamp potentials when the frame synchronizing signal is not detected by the frame synchronizing signal detecting means and outputting a predetermined clamp potential when the frame synchronizing signal is detected by the frame synchronizing signal detecting means, and clamping means responsive to the clamping pulse for clamping the analogue video signal at the clamp potential from the clamp potential switching means.

According to the present invention, the clamp potential is switched and the analogue video signal is clamped as described above, so that the frame synchronizing signal in the analogue video signal is clamped to be located at a predetermined level in the above described transient state. Therefore, the frame synchronizing signal is correctly detected. As a result, the analogue video signal is restored to the normal clamp potential.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 3(a) shows a case in which a reference level is clamped at a clamp potential and FIG. 3(b) shows a case in which a black level is clamped at the clamp potential;

DESCRIPTION OF THE PREFERRED EMBODIMENT

Figure 4:
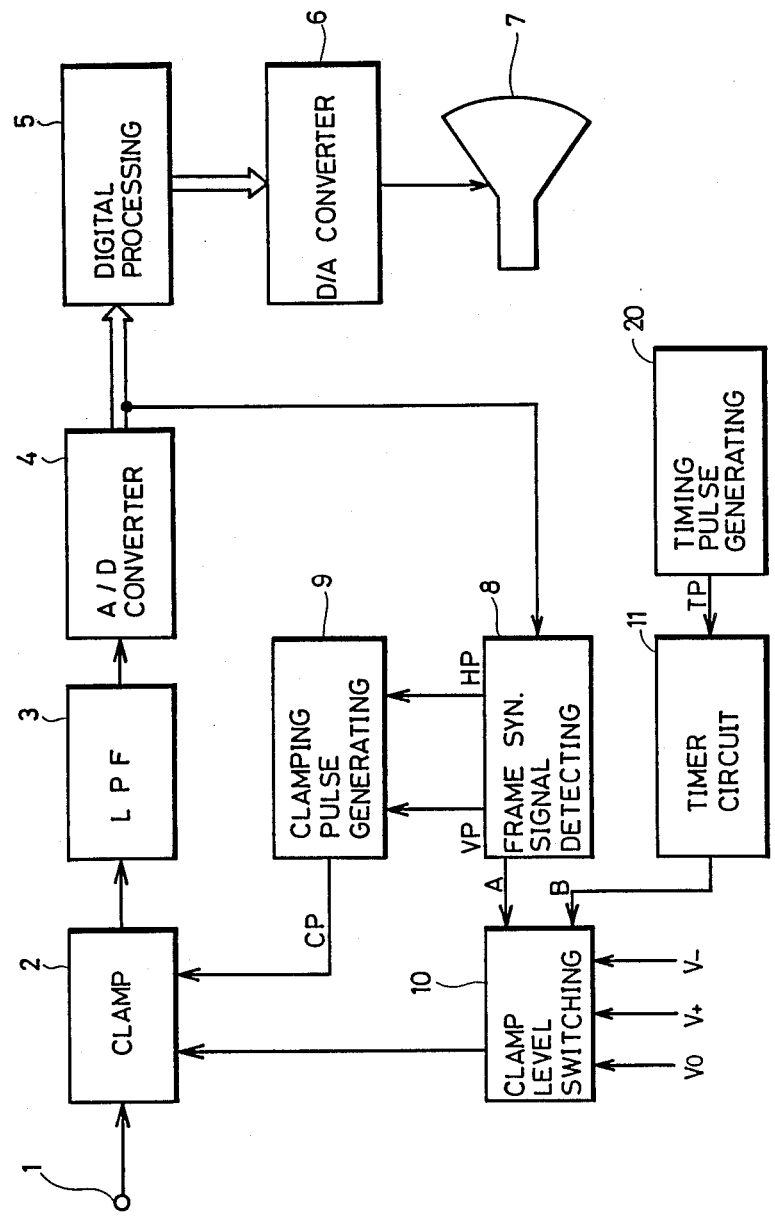
FIG. 4 is a block diagram showing main portions of a high-resolution television receiver according to an embodiment of the present invention.

FIG. 4 is a diagram showing an embodiment in which the present invention is applied to the above described high-resolution television receiver. In FIG. 4, the same portions as those in the conventional example shown in FIG. 2 have the same reference numerals and hence, description thereof is omitted. Only characteristic portions of the present embodiment will be described.

In FIG. 4, a clamp level switching circuit 10, a timer circuit 11 and a timing pulse generating circuit 20 are newly provided in the present embodiment. A frame synchronizing signal detecting circuit 8 outputs a detection signal A depending on whether or not the frame synchronizing signal F is detected. The detection signal A becomes "1" when the frame synchronizing signal F is detected and becomes "0" when the frame synchronizing signal F is not detected. The timer circuit 11 frequency-divides a timing pulse TP applied from the timing pulse generating circuit 20 and outputs a switching signal B which alternately switches between "0" and "1" every a constant time period more than the frame cycle. The timing pulse TP has the same cycle as that of the frame synchronizing signal F. However, the timing pulse TP is asynchronous with the frame synchronizing signal F. The clamp level switching circuit 10 is responsive to the detection signal A from the frame synchronizing signal detecting circuit 8 and the switching signal B from the timer circuit 11 for selecting one of three clamp potentials $V_0$, $V_+$ and $V_-$ and applying the same to a clamping circuit 2.

Figure 5:
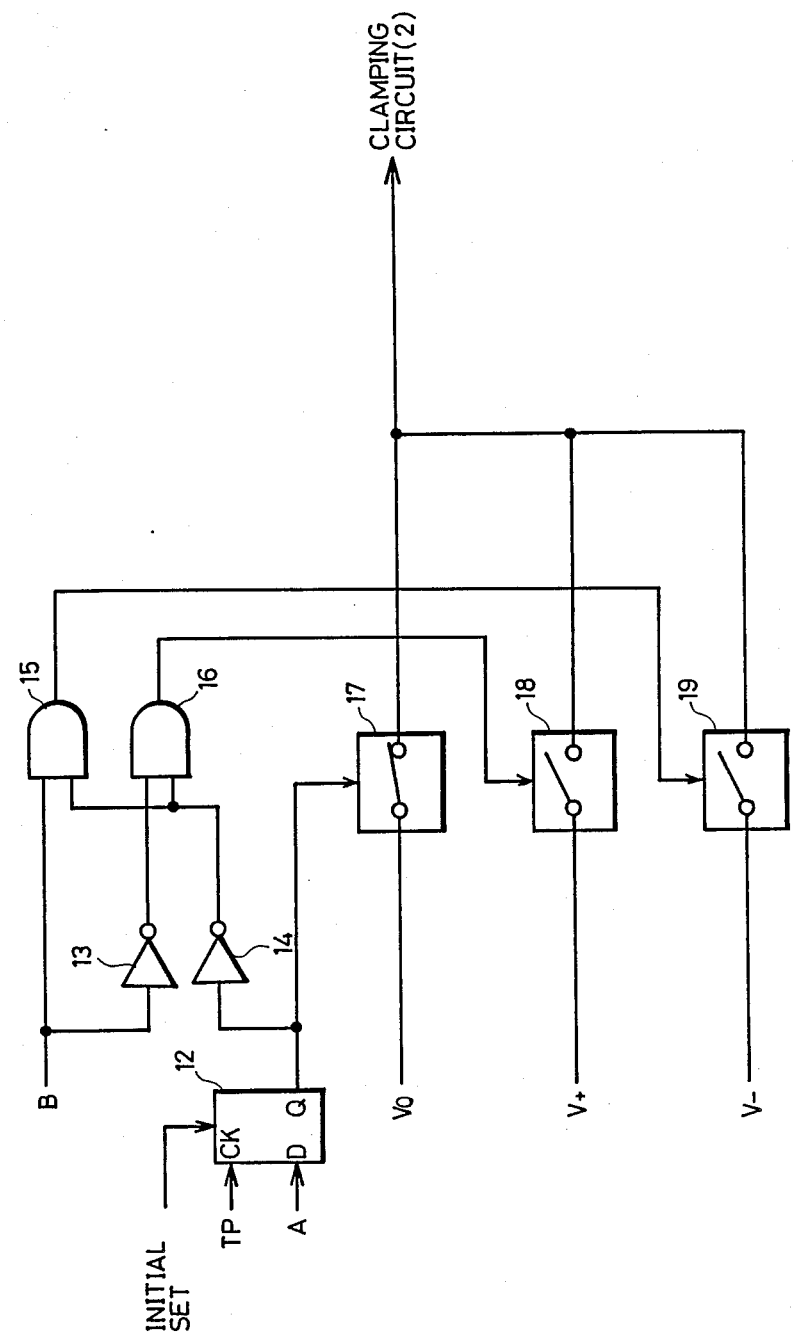
FIG. 5 is a circuit block diagram showing an internal structure of a clamp level switching circuit included in the high-resolution television receiver shown in FIG. 4.

As shown in FIG. 5, the clamp level switching circuit 10 comprises a D flip-flop 12, inverters 13 and 14, AND gates 15 and 16 and first to third analogue switches 17, 18 and 19. The D flip-flop 12 has a clock terminal CK receiving the timing pulse TP having the frame cycle and an input terminal D receiving the detection signal A from the frame synchronizing signal detecting circuit 8. An output from an output terminal Q of the D flip-flop 12 is applied to one input terminal of the AND gate 15 and one input terminal of the AND gate 16 through the inverter 14. The AN gate 15 has another input terminal receiving the switching signal B from the timer circuit 11. The AND gate 16 has another input terminal receiving the switching signal B from the timer circuit 11 through the inverter 13. The output from the output terminal Q of the D flip-flop 12 is applied to the first analogue switch 17. An output of the AND gate 16 is applied to the second analogue switch 18. An output of the AND gate 15 is applied to the third analogue switch 19. The first analogue switch 17 has an input terminal receiving the normal clamp potential $V_0$ The second analogue switch 18 has an input terminal receiving the upper clamp potential $V_+$. The third analogue switch 19 has an input terminal receiving the lower clamp potential $V_-$. The first analogue switch 17, the second analogue switch 18 and the third analogue switch 19 have output terminals connected to the clamping circuit 2.

The D flip-flop 12 is responsive to the timing pulse TP having the above described frame cycle for latching the detection signal A from the frame synchronizing signal detecting circuit 8. When the output from the output terminal Q of the D flip-flop 12 is "1", the first analogue switch is closed, so that the normal clamp potential $V_0$ is outputted. When the output from the output terminal Q of the D flip-flop 12 is "0", the output of the AND gates 15 or 16 is "1" depending on the state of the switching signal B from the timer circuit 11 (in FIG. 4), so that the second analogue switch 18 or the third analogue switch 19 is closed. As a result, the upper clamp potential $V_+$ or the lower clamp potential $V_-$ is outputted. In such a case, the output from the output terminal Q of the D flip-flop 12 is set to "1" immediately after reception is started by initial setting at the time of turning on a power supply.

Figure 1:
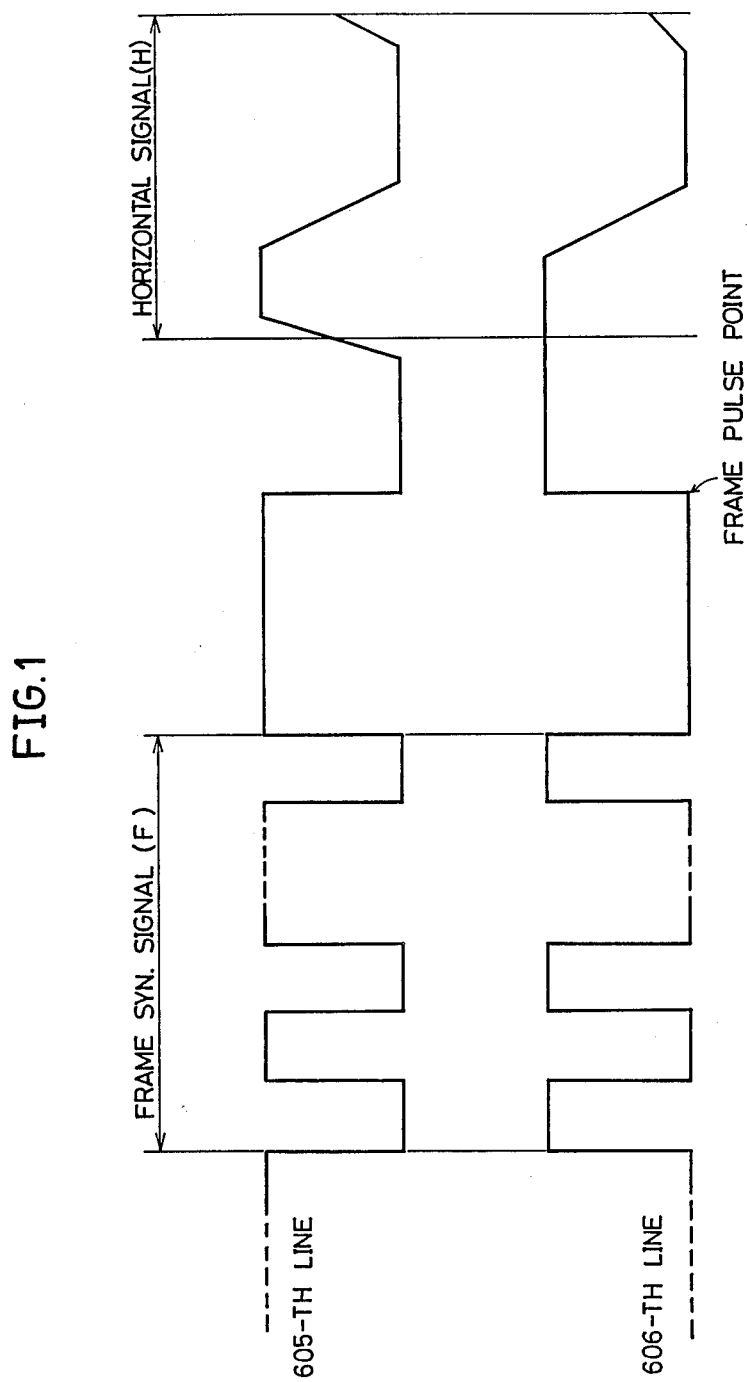
FIG. 1 is a waveform diagram showing portions of synchronizing signals in a high-resolution television signal.
Figure 2:
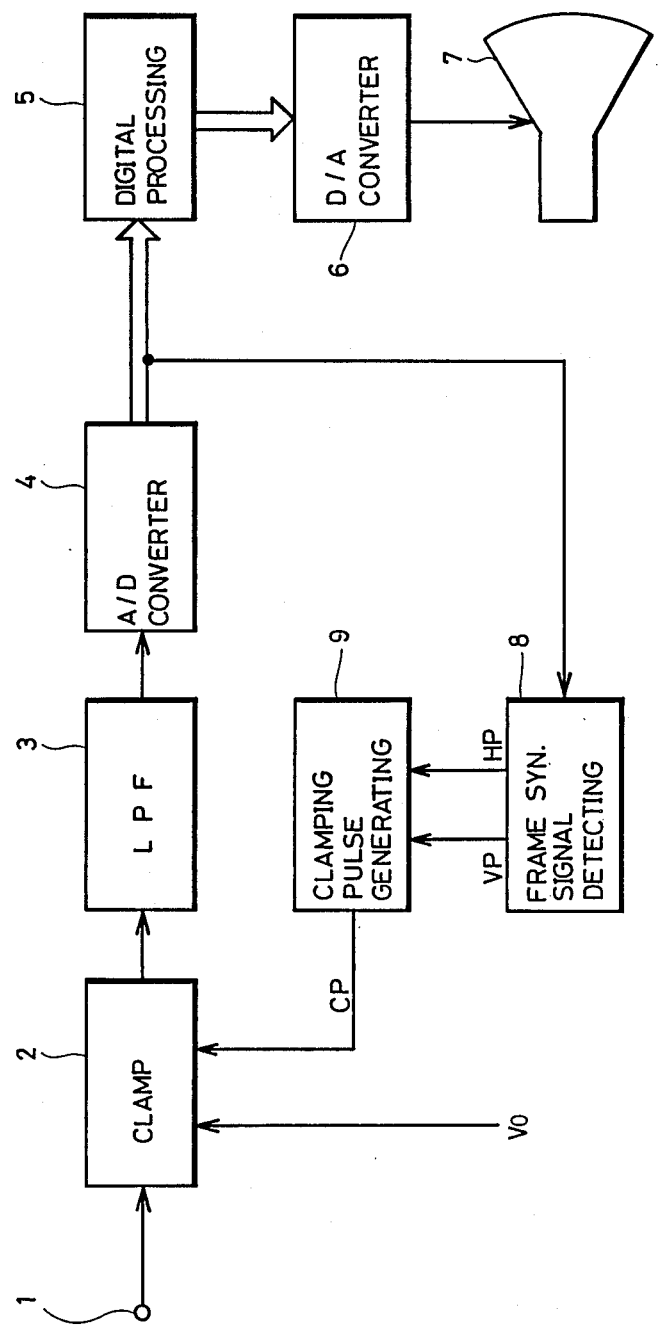
FIG. 2 is a block diagram showing main portions of a conventional high-resolution television receiver.
Figure 3:
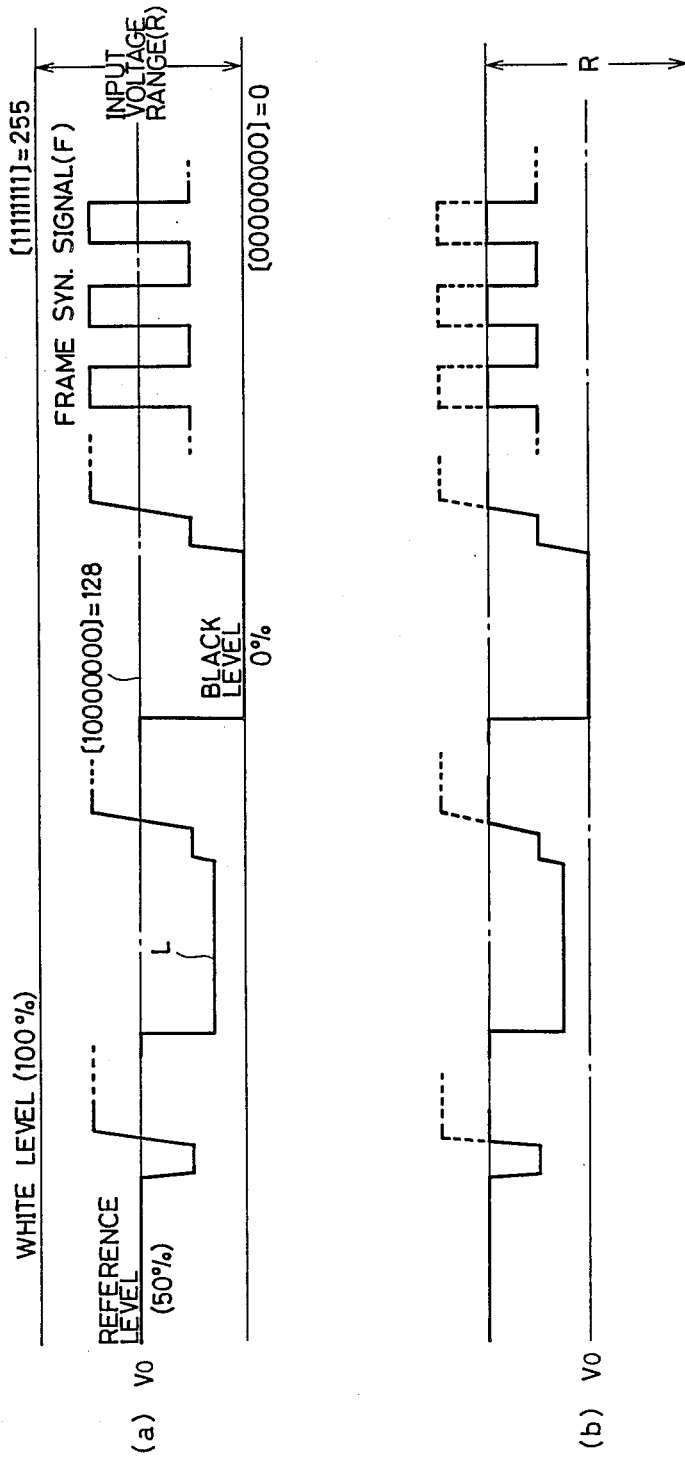
FIGS. 3(a) and 3(b) are waveform diagrams for explaining a clamping operation, where

The normal clamp potential $V_0$ is set to the middle value of the range of input voltage of the A/D converter 4 in the same manner as the case shown in FIG. 2. However, the upper clamp potential $V_+$ is set to a potential which is higher, by half (50%) of the amplitude of the inputted video signal (in FIG. 3), then the normal clamp potential $V_0$ and the lower clamp potential $V_-$ is set to a potential which is lower, by half of the above described amplitude, than the normal clamp potential $V_0$.

Thus, in the clamping circuit 2, when a black level of the inputted video signal is erroneously clamped at the normal clamp potential $V_0$ as shown in FIG. 3(b), the detection signal A from the frame synchronizing signal detecting circuit 8 becomes "0" as described above. Consequently, when the switching signal B from the timer circuit 11 is "1", the upper clamp potential $V_-$ is applied to the clamping circuit 2 by the clamp level switching circuit 10. On the other hand, when the switching signal B is "0", the upper clamp potential $V_+$ is applied thereto by the clamp level switching circuit 10. Thus, when the lower clamp potential $V_-$ is applied, the black level is clamped at the lower clamp potential $V_-$, so that the frame synchronizing signal F in the video signal is located in 25 to 75% of the range R of input voltage of the A/D converter 4. Therefore, the frame synchronizing signal F is detected in the frame synchronizing signal detecting circuit 8 and the detection signal A therefrom becomes "1" representing "detected". When the frame synchronizing signal F is detected once, a clamping pulse CP is generated from a clamping pulse generating circuit 9 at normal timing, so that the clamping circuit 2 is responsive to the clamping pulse CP for clamping a 50% reference level within the vertical blanking time period in the video signal. At that time, when A equals "1", the normal clamp potential $V_0$ is applied to the clamping circuit 2, so that the reference level of the video signal is clamped at the clamp potential $V_0$. Thereafter, the frame synchronizing signal F is normally detected and the clamping operation is normally performed.

On the other hand, when the upper clamp potential $V_+$ is first applied in response to the switching signal B from the timer circuit 11, the clamping circuit 2 does not normally perform a normal operation. When the switching signal B is then switched to "1" so that the lower clamp potential $V_-$ is applied, the clamping circuit 2 performs the above described operation.

Additionally, if and when a white level of the inputted video signal is erroneously clamped at the clamp potential $V_0$, switching to the upper clamp potential $V_+$ is performed in the same manner, resulting in the transition to the above described normal operating state.

Meanwhile, when not only the black level (0%) or the white level (100%) of the video signal as described above but also an arbitrary level less than 25% (L in FIG. 3(a)) or more than 75% is erroneously clamped, the foregoing operation is also performed.

As described in the foregoing, according to the clamping circuit of the present invention, when the analogue video signal of a positive polarity synchronization type is dc-clamped once as processing before converting the video signal into a digital signal, the transition to the normal clamped state can be automatically made even if the clamping operation is performed with respect to an erroneous level in the transient time period, for example, immediately after reception is started. Thus, the above described A/D conversion, detection of the synchronizing signal responsive to an A/D converted output, and the like can be correctly achieved. In addition, the operations can be achieved at a low cost by only adding a circuit having a very simple structure.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A clamping circuit for clamping at a predetermined potential an analogue video signal of a positive polarity synchronization type in which a frame synchronizing signal exists in the range of the level of a video signal, comprising:
   frame synchronizing signal detecting means for detecting said frame synchronizing signal from said analogue video signal,
   clamping pulse generating means responsive to an output of said frame synchronizing signal detecting means for generating a clamping pulse,
   clamp potential switching means for periodically selecting a different one of a plurality of different clamp potentials when said frame synchronizing signal is not detected by said frame synchronizing signal detecting means, and selecting a predetermined clamp potential when said frame synchronizing signal is detected by said frame synchronizing signal detecting means, and
   clamping means responsive to said clamping pulse for clamping said analogue video signal on a clamp potential selected by said clamp potential switching means.

2. A clamping circuit according to claim 1, wherein said frame synchronizing signal detecting means comprises
   converting means for converting said analogue video signal into a digital signal, and
   detection means for detecting said frame synchronizing signal based on said digital signal from said converting means.

3. A clamping circuit according to claim 2, wherein said frame synchronizing signal detecting means outputs a detection signal at a first logical level when said frame synchronizing signal is not detected and outputs a detection signal at a second logical level when said frame synchronizing signal is detected, said clamp potential switching means comprises
   timer means for generating a switching signal in a constant cycle more than the cycle of said frame synchronizing signal, and
   potential switching means responsive to said detection signal at the first logical level and said switching signal for outputting a different one of said plurality of different clamp potentials in said constant cycle and responsive to said detection signal at the second logical level for outputting said predetermined clamp potential.

4. A clamping circuit according to claim 3, wherein said predetermined clamp potential is a potential in the middle value of the range of input voltage of said converting means, and said plurality of different clamp potentials comprise a potential which is higher, by half of the amplitude of said analogue video signal, than said predetermined clamp potential and a potential which is lower, by half of the amplitude of said analogue video signal, than said predetermined clamp potential.

5. A clamping circuit according to claim 3, wherein said timer means comprises pulse generating means for generating a timing pulse having the same cycle as that of said frame synchronizing signal, and frequency-dividing means for frequency-dividing said timing pulse from said pulse generating means.

6. A clamping circuit according to claim 1, wherein said analogue video signal comprises a reference level having a level of half of the amplitude of the analogue video signal in a predetermined position, and said clamping pulse generating means is responsive to an output of said frame synchronizing signal detecting means for generating said clamping pulse at a timing of said reference level.

7. A clamping circuit according to claim 6, wherein said frame synchronizing signal detecting means is responsive to said frame synchronizing signal for generating a horizontal synchronizing pulse and a vertical synchronizing pulse, and said clamping pulse generating means for responsive to said horizontal synchronizing pulse and said vertical synchronizing pulse for generating said clamping pulse at timing of said reference level which exists in a predetermined position within a vertical blanking time period.

* * * * *